United States Patent

[11] 3,602,889

[72] Inventors Byron G. Gayman
Framingham;
Ronald D. Malcolm, Marlborough, both of, Mass.

[21] Appl. No. 796,721
[22] Filed Feb. 5, 1969
[45] Patented Aug. 31, 1971
[73] Assignee Honeywell Inc.
Minneapolis, Minn.

[54] EXTENDED ADDRESSING FOR PROGRAMMED DATA PROCESSOR HAVING IMPROVED REGISTER LOADING MEANS
16 Claims, 4 Drawing Figs.

[52] U.S. Cl. .......... 340/172.5
[51] Int. Cl. .......... G06f 9/20
[50] Field of Search .......... 340/172.5; 235/157

[56] References Cited
UNITED STATES PATENTS

| | | | |
|---|---|---|---|
| 3,061,192 | 10/1962 | Terzian .......... | 340/172.5 |
| 3,094,610 | 6/1963 | Humphrey, Jr. et al. .......... | 340/172.5 |
| 3,218,611 | 11/1965 | Kilburn et al. .......... | 340/172.5 |
| 3,258,748 | 6/1966 | Schneberger et al. .......... | 340/172.5 |
| 3,311,890 | 3/1967 | Waaben .......... | 340/172.5 |
| 3,328,770 | 6/1967 | Silver .......... | 340/172.5 |
| 3,428,951 | 2/1969 | Lindell .......... | 340/172.5 |

*Primary Examiner*—Paul J. Henon
*Assistant Examiner*—Harvey E. Springborn
*Attorneys*—Fred Jacob, W. Hugo Liepmann and John S. Solakian

ABSTRACT: A digital data processor of low cost construction has a common transfer bus arranged to transfer information between processor registers and to circulate information between the input and output terminals of the same register, and has control switches connected directly with the transfer bus for direct manual operation of processor registers. Further, an inhibiting flip-flop in the processor control unit directs memory cycles to a fixed memory sector without regard to the sector address stored in the registers that normally furnish the memory sector address.

RONALD D. MALCOLM
BYRON G. GAYMAN
INVENTORS

BY W. Hugo Liepmann
ATTORNEY

RONALD D. MALCOLM
BYRON G. GAYMAN
INVENTORS

BY W. Hugo Liepmann
ATTORNEY

RONALD D. MALCOLM
BYRON G. GAYMAN
INVENTORS

BY W. Hugo Liepmann

ATTORNEY

EXTENDED ADDRESSING FOR PROGRAMMED DATA PROCESSOR HAVING IMPROVED REGISTER LOADING MEANS

BACKGROUND

This invention relates to a digital data processor characterized by efficient use of logic elements to attain fast and flexible operation with minimal hardware. The invention is useful in providing a processor having a stored program, i.e. a program that can readily be changed to perform different operations, but yet operating with short words, with comparatively few registers, and with relatively elementary gating and control logic. Such a processor can be constructed at unusually low cost, but has wide application.

The widespread use of computers to control relatively small machines, such as typesetters or metalworking, e.g. milling machines and the like depends to a large part on the ability to construct computers at low cost. However, even a low cast computer for such relatively simple purposes should be basically general purpose with a stored program, rather than be constructed for a specific purpose with a prewired program. Further, such a computer should have a processor that is logically arranged so that the computer can be programmed at relatively low cost and so that it operates efficiently with relatively few steps and hence with comparatively high speed.

However, in providing low cost processors for such tasks with the prior art, considerable sacrifices have been made in the flexibility of operation and in the capability to perform varied tasks without undue processing time. This is because the processors have been tailored for a specific task.

Also, lower cost computers of this character should have a processor that it is easy to operate, for the users of these machines seldom have more than minimal training in computer operation and often have essentially no knowledge of the operating principles of the computer.

Accordingly, it is an object of this invention to provide a low cost digital data processor characterized by highly flexible and multifaceted operation.

Another object is to provide a digital data processor of the above character for operation under control of a stored program with words of uniform short length. A further object is to provide a processor of the above character that operates with a single memory cycle for each instruction fetch. This is in contrast to the known technique of requiring two or more memory cycles to fetch a single instruction.

A further object is to provide a processor that, after an interrupt operation, restores the preinterrupt memory address information to the processor registers in an efficient manner, i.e. with few memory cycles, with general purpose instructions, and with essentially minimal logic circuits.

Another object of the invention is to provide a low cost processor of the above character so arranged that control switches and indicators can operate with any one of a number of the processor registers with minimal hardware unique to this operation.

It is also an object of the invention to provide a digital data processor in which the control panel switches and indicators can operate with the registers of the processor without the use of intermediate data stores and display logic.

Another object of the invention is to provide a digital data processor operating with relatively short words which can address different sectors of memory in an efficient manner. A more particular object is to provide such a processor in which the memory sector address can be changed and then readily restored.

It is also an object that the processor provide the above operation with minimal gating structure and with only fixed-word format.

Other objects of the invention will in part be obvious and will in part appear hereinafter.

SUMMARY OF INVENTION

Considered briefly, the processor of the present invention has a transfer bus interconnecting the several registers to handle information transfers between them and with external devices. The bus provides signal paths between the output gates of the registers and the register input gates. Further, control panel selection switches are arranged to enable all these input and output gates associated with any one register, thereby causing the bus to recirculate the contents of that register from its output gates back to its input gates. Hence, when the selection switches are operated to select a register, the information stored therein is applied to the bus and circulated back to the input of the register to maintain the storage of that information. The invention also provides indicators connected directly with the bus to display the stored information.

Further, "load" switches on the control panel are gated directly to the transfer bus to force any of the signal paths therein to carry a selected signal level. With this arrangement, the load switches can be set to place any desired information in whichever register is selected with the selection switches.

This construction of a recirculating transfer bus, to which the panel switches and panel indicators are connected directly, makes it possible for any processor register to be controlled from the panel with minimal panel controls and logic circuits. Further, this construction does not require additional storage registers or display gating logic intermediate the processor registers and the panel controls or indicators, as found in the prior art.

The processor registers are further organized for efficient handling of memory sector addresses. In particular, the processor retains a sector address when operation in that sector is interrupted by a branch or like instruction. Hence, when the processor has completed the branching routine and is ready to resume operation in the previously addressed sector of memory, it simply restores the "saved" sector address and proceeds. This avoids the use of separate memory cycles to locate and restore the sector address involved in the interrupted operation.

The processor also is arranged to inhibit the usual transfer of a sector address to the register that addresses the memory, and instead to force a fixed selected sector address into that register. Further, this "Forced sector" operation maintains undisturbed the sector address information stored elsewhere in the processor, e.g. in a sector register and/or in the program counter. This construction facilitates restoring the processor to a preinterrupt status, following an interrupt routine, with few instructions and without special storage and/or gating hardware.

These and other features of the processor described in detail below enable a general purpose, stored program, digital data processor, to be constructed at unusually low cost. Further, by way of example, a processor constructed in accordance with the invention operates with a fixed word format of only nine bits length and requires only a small memory, but performs a variety of routines including the automatic control of small processes and machines.

The invention accordingly comprises the features of construction, combinations of elements, and arrangement of parts exemplified in the constructions hereinafter set forth and the scope of the invention is indicated in the claims.

DESCRIPTION OF DRAWINGS

For a fuller understanding of the nature and objects of the invention reference should be had to the following detailed description taken in connection with the accompanying drawings, in which.

DESCRIPTION OF ILLUSTRATED EMBODIMENT

Figure 1:
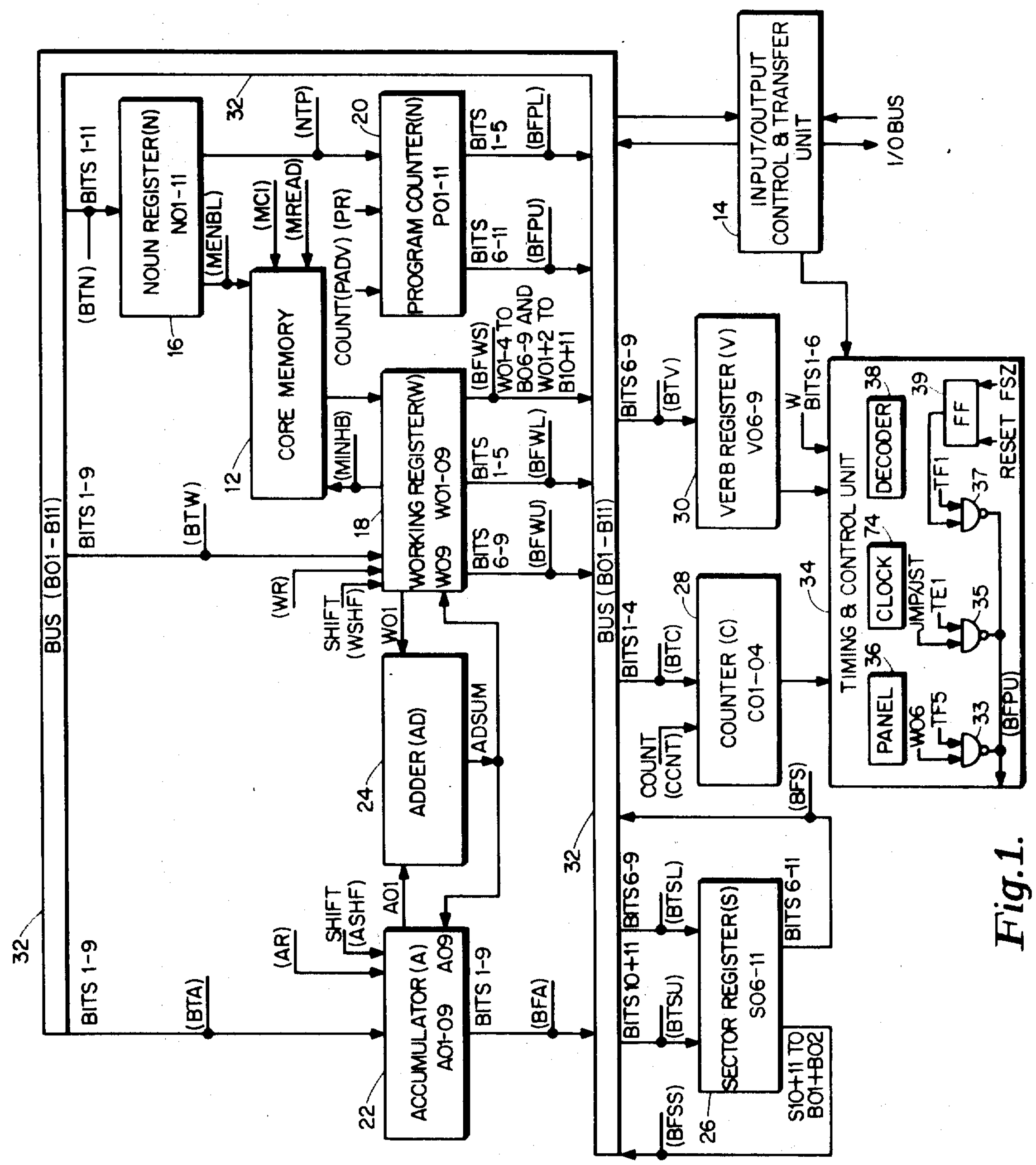
FIG. 1 is a block diagram of a computer having a processor embodying the invention.

FIG. 1 shows a computer having a processor embodying the invention connected with a main memory 12 in the form of a conventional core memory, and connected with external devices by way of an input/output control and transfer unit 14. The illustrated processor has a memory address register in the form of noun register 16, a memory buffer or memory data register in the form of a working register 18, a program counter 20, an accumulator 22 and an adder 24. There is also a sector register 26, a counter 28, and an Op-code or verb register 30. The above-mentioned apparatus and the description hereinbelow are further amplified in a publication entitled "Stored Program Controller Instruction Manual," Volumes I and II, dated June 1968, by Honeywell Inc., Honeywell Document Number 130072003A.

A transfer bus 32 in the processor is connected with the inputs and outputs of the above elements, except for the adder, as shown. The bus provides transfer paths between the register output and input gates ordered so that one path is associated with each digit position. Similarly, each illustrated register, including counters 20 and 28, has plural binary stages ordered with each stage storing a digit having a designated bit position. Also, as shown for example with reference to FIG. 2 discussed hereinafter, the bus transfer paths include gates that clamp each transfer path to a binary ZERO signal level in the absence of other signals being applied to the bus.

The control signals that gate information from the bus 32 to the processor elements and that gate information from the processor elements to the bus are also indicated in parenthesis. By way of example, the binary digits on the bus conductors associated with bits 1 through 9 are gated into the accumulator 22 in response to a Bus To Accumulator (BTA) control signal.

Similarly, a Bus From Accumulator (BFA) signal gates the contents of the accumulator stages 1 through 9 onto the bus conductors associated with bits 1 through 9. As a further example, the verb register 30 stages associated with bits 6 through 9 receive the digits on the bus conductors associated with bits 6 through 9 in response to a Bus To Verb (BTV) signal. Note that the contents of the noun register 16 are transferred to the program counter 20 without use of the bus 32 in response to a Noun To Program (NTP) control signal.

As also shown in FIG. 1, the processor has a timer and control unit 34 that produces the control signals indicated on the drawing. The unit 34 is connected with the input/output unit 14 and with the processor elements as shown, except that, for simplicity, the control signal connections are not drawn out.

The illustrated processor operates with words of 9-bit length. The bits are numbered starting with 1, which is the lowest order bit. Further, the illustrated processor operates with a memory 12 having 2048 locations for such words and organized into four pages, with each page being organized to have 16 sectors, and with each sector having 32 word locations. Thus a complete memory address for this illustrated arrangement has 11 bits, of which bits 1 through 5 identify one of 32 word locations in the sector identified with bits 6 through 9 and in the page identified with bits numbered 10 and 11.

The noun register 16 and the program counter register 20 are illustrated as having an 11-bit capacity in order to store this 11-bit memory address. The working register 18 and the accumulator 22 need have only 9-bit capacity for handling words of the same length as the memory words. The sector register 26 has a 6-bit capacity and is connected with the bus to receive bits numbered 6 through 11 in order to store sector and page address information.

The processor is further illustrated with an instruction word formatted with bits numbered 1 through 5 specifying a word location within a sector. Further, bit number 6 of the instruction word is a ZERO when that location is in the same sector as the previous instruction and hence in the sector and page currently addressed by the program counter, but is a ONE when that location is in a sector identified by the contents of the sector register. Bits 7 through 9 of the instruction word contain the verb portion of the address, which is the code (often termed the "op-code") identifying the type of instruction. The verb register 30 is constructed to receive bits 6 through 9 of instruction words and to apply them, as is conventional, to a decoder 38 within the timing and control unit 34 to produce the sequence of command signals appropriate for executing the instruction.

The timing and control unit 34 of FIG. 1 develops the control signals indicated in the figures with logic circuits having conventional building blocks, and the sequence in which they are produced is described hereinafter for certain instructions with reference to the flow charts in FIGS. 3A and 3B.

However, before discussing these flow charts, logic circuits illustrating certain features of the invention and used for generating the Bus From Program Counter Upper (BFPU) control signal will now be described with further reference to the control unit 34 in FIG. 1. This signal is used to transfer the upper order bits, bits 6 through 11, from the program counter 20 to the transfer bus 32. Hence the function of this control signal is to apply the sector and page address stored in the program counter to the bus for transfer generally either to the noun register 16 for assembling a memory address or to the sector register 26. Specifically, as shown in the control unit 34, a NAND gate 33 receives signals to produce the BFPU control signal, for transferring sector and page address information from the program counter to the bus for further transfer to the noun register, near the end of a fetch cycle when the memory address for use in the subsequent execution is being assembled in the noun register 16. Accordingly the gate 33 produces the BFPU signal when it coincidentally receives a timing pulse TF5 developed in the latter portion of a fetch cycle and receives also a signal designated "WO6" having an assertion value when the number 6 bit in the working register 18, i.e. the sector bit of an instruction word, is a ZERO.

In addition, a NAND gate 35 produces the BFPU signal during the initial portion of an execution cycle for a jump (JMP) or jump-store (JST) instruction. Accordingly, the gate 35 receives a TE1 timing pulse early in the execution cycle and receives a signal produced in the decoder 38 of the unit 34 when either the jump or jump-store instruction is being performed.

As also shown in FIG. 1, the timing and control unit 34 produces the BFPU signal with a NAND gate 37 in response to a TF1 pulse i.e. timing pulse produced early in the fetch cycle. However, a flip-flop 39 is also connected to the gate 37 to inhibit production of the BFPU signal in response to TF1 pulse when the flip-flop 39 is set. As indicated, the flip-flop 39 is set by a "force sector zero" (FSZ) instruction. The sole purpose of this instruction is to set the flip-flop 39. The flip-flop 39 is reset during the execution of jump and jump-store instructions as discussed hereinafter.

Thus, when the flip-flop 39 is set, a BFPU signal is not produced in response to the fetch cycle timing pulse TF1. Hence no signals are placed on the transfer bus conductors associated with bits 6 through 11 during this timing interval and hence the bus conductors are at a state corresponding to a binary ZERO. Consequently, when for example, the noun register is gating in information from the bus during the same time interval, i.e. receiving a BTN signal, the noun register will receive a ZERO sector and ZERO page address, rather than the addresses in the program counter.

The significance of this arrangement and its value in a processor having the present organization will now be illustrated with reference to the manner to which the processor performs operations involving the sector and page addresses.

In particular, with the BFPU signal inhibited in the foregoing manner, i.e., when flip-flop 39 is set, the processor of FIG. 1 can, at the end of interrupt operation, restore the registers to their status prior to the interrupt with few steps and with reference to relatively few memory locations. Further, the restoration sequence requires relatively few logic circuits.

Specifically, the processor is operated to store the page address of current operation in the interrupt subroutine. This is done by storing, at a selected address in sector ZERO associated with the interrupt subroutine, a Load Sector Upper (LSU) instruction in which the address bits are continually updated with the memory page of current operation. When the processor starts an interrupt operation, it is constructed to store the preinterrupt word and sector addresses currently in the program counter in memory sector ZERO. Similarly, the sector address and page address currently in the sector register are saved in memory sector ZERO.

Accordingly, at the end of the interrupt operation, in restoring the program counter and sector register with their preinterrupt contents, the timing and control unit 34 operates according to the interrupt subroutine and retrieves the saved information from sector ZERO. However, to minimize control circuitry and also to minimize the number of special instructions, the program counter is loaded with the preinterrupt page and sector addresses by first placing those addresses in the sector register and then transferring them from the sector register to the program counter. Thereafter, the processor still has to restore the sector register. However to do so will require the memory again to fetch instructions from sector ZERO, but the program counter, from which the processor obtains its sector addresses, contains the preinterrupt sector address. It is for this reason that the force sector zero flip-flop 39 in the unit 34 is provided, for it forces the noun register to receive a sector ZERO address without regard for, and without disturbing, the restored sector address in the program counter.

The specific sequence of instructions which the processor generates to restore the program counter and sector register in resuming normal operation after an interrupt, hence begins with a pair of instructions that load the upper and lower order stages of the sector register with the preinterrupt contents of the program counter, which were saved in memory sector ZERO. Specifically, the interrupt subroutine calls for a Load Sector Upper (LSU) instruction that begins by reading out from the core memory 12 into the working register 18 the page address stored in memory sector ZERO.

Note however that the illustrated working register 18 receives this page address information in its bit numbered 1 through 2, whereas the sector register 26 must place the information in the program counter bit locations 10 and 11. The invention resolves this seeming conflict without having to expand the working register to 11 bits and without employing shift operations by providing, in addition to the gates that transfer the working register bits 1 through 5 to the associated bus paths in response to the BFWL signal and the gates that transfer the register 18 bits 6 through 9 to the associated bus paths in response to the BFWU signal, further gates that respond to a BFWS signal to transfer the working register bits 1 through 4 to the bus paths associated with bits 6 through 9 and simultaneously transfer the working register bits 1 and 2 to the bus paths associated with bits 10 and 11. Hence with this arrangement, after the control unit operates to fetch the Load Sector Upper instruction, which contains the preinterrupt page address, from memory sector ZERO and loads this address into the working register bits 1 and 2 the control unit produces the BFWS and BTSU signals simultaneously. The former signal transfers the contents of the working register bits 1 and 2 to the bus conductors associated with bits 10 and 11, and the latter signal transfers these bits to the sector register stages 10 and 11.

A subsequent Load Sector Lower instruction in the interrupt subroutine causes the sector address saved from the program counter prior to the interrupt to be retrieved from memory sector ZERO and loaded into the working register bits 1–4. Then in further response to the LSL instruction, the time and control unit 34 produces simultaneously a BFWS and BTSL control signals. The first of these transfers the contents of working register bits 1–4 to the bus conductors associated with bits 6–9, and the BTSL signal transfers the information on these bus conductors to the lower order stages of the sector register i.e. to the bit locations 6–9. In this manner, the preinterrupt sector and page contents of the program counter are loaded into the sector register.

At this juncture, the sector register is ready to restore the preinterrupt page and sector addresses to the program counter. Immediately thereafter the processor will prepare its next memory address from this address in the program counter and commence operation in the sector thus addressed. However, this should not take place, for the processor has not restored the sector register to its preinterrupt status. Accordingly, the interrupt subroutine calls for a FSZ instruction, which sets the force sector zero flip-flop 39 in the FIG. 1 control unit 34.

Next, the processor executes a normal jump instruction that calls for operation in the sector addressed in the sector register i.e. an instruction with the sector bit, number 6, of the instruction word at a ONE. As described below with reference to FIG. 3B, this instruction transfers to the program counter the page and sector address in the sector register, thereby restoring the upper program counter stages to their preinterrupt status. Because the flip-flop 39 is set during the fetch and execution cycles of the instructions, the noun register is found to receive sector ZERO and page ZERO addresses, so that the processor continues operating in memory sector zero rather than in the memory sector which the program counter now addresses.

To restore the sector register to its preinterrupt status, the computer executes another succession of Load Sector Upper and Load Sector Lower instructions, still with the force sector zero flip-flop 39 set so that memory sector zero is addressed. With these instructions, the preinterrupt contents of the sector register are retrieved from the memory sector ZERO and loaded into the sector register.

The computer is now ready to execute the last instruction in the interrupt subroutine and resume its preinterrupt operation. This final instruction is simply a jump instruction with the number six, i.e. sector, bit being ZERO. As described hereinafter with reference to FIG. 3B, the sequence of control signals produced and executed with this instruction transfer the location address that is part of the JMP instruction word to the low order stages of the noun register, reset the force sector zero flip-flop 39, and then transfer the sector address and page address previously restored to the program counter to the noun register. The noun register now contains the full memory address for resuming operation in the routine it was processing prior to the interrupt; this address is then transferred to the program counter, thereby restoring it as desired.

It should now be appreciated that the present arrangement of the processor registers with the transfer bus and the present provision of the force sector zero flip-flop in the control and gating unit logic that generates the BFPU signal, facilitates recovery from interrupt routines. Specifically, the processor uses essentially only general purpose instructions, i.e. instructions that are used in other routines, rather than requiring special instructions unique to the interrupt recovery routine. Hence the present processor reduces the number of locations in memory needed for storing instructions, and maintains at a minimum the number of registers and logic circuits required for the computer to provide a flexible interrupt capability.

The foregoing operations with sector and page addresses provided in accordance with the present invention will now be described in further detail with reference to the FIG. 3A flow chart of a fetch cycle and then with reference to the execution cycle of branch (JMP and JST) instructions as depicted with the flow chart of FIG. 3B.

Figure 3A:
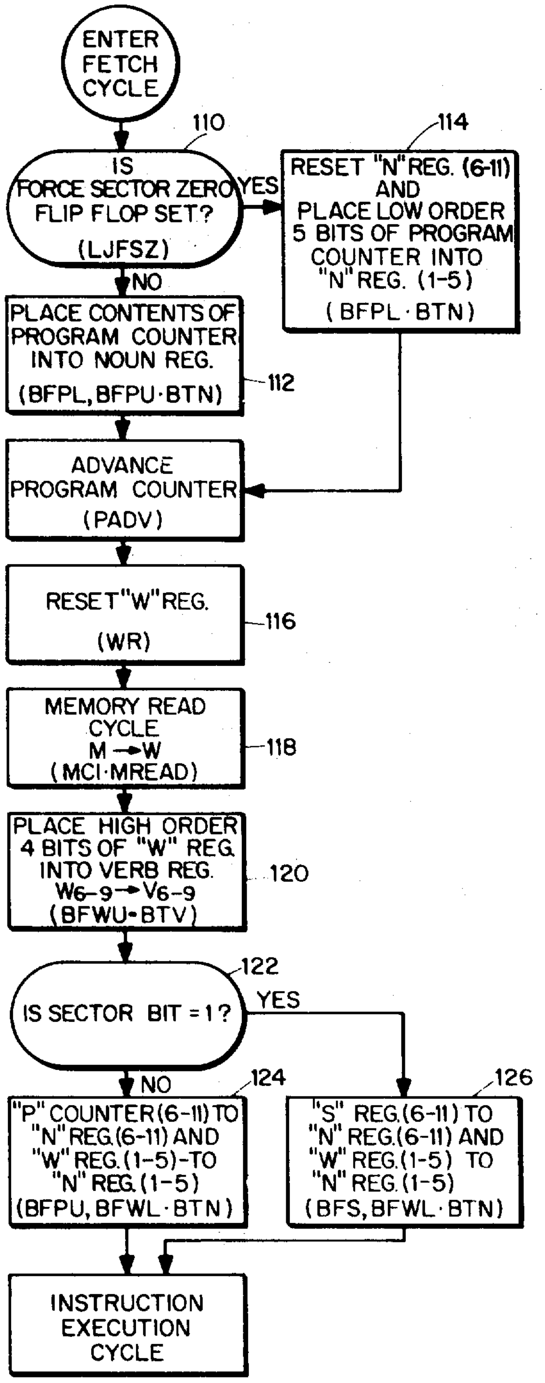
FIGS. 3A and 3B are flow charts of operating sequences illustrating the manner in which the processor of FIG. 1 operates in accordance with the invention.

As shown in the flow chart in FIG. 3A for a fetch cycle, after entry into the cycle and as indicated with the decision box 110, when the force sector zero flip-flop 39 FIG. 1 is not set, the timing and control unit 34 produces the control signals BFPL, BFPU and BTN to execute the operation designated in the operation box 112. Specifically, the BFPL and BFPU signals (Bus From Program Lower and Bus From Program Upper) gate the lower and upper order bits the program counter 20 onto the transfer bus 32. The BTN (But To Noun) signal gates the signals on the transfer bus into the noun register 16. Accordingly, these three signals transfer to the noun register the 11-bit memory address in the program counter.

On the other hand, when the force sector zero flip-flop is set, it is indicated by a "yes" decision from the box 110, the timing and control unit 34 does not perform the operation indicated in the operation box 112 but instead produces the BFPL and BTN signals as indicated within the operation box 114. That is, as discussed above, when the flip-flop 39 is set, the upper order bits, i.e. the sector and page addresses, in the program counter are not applied to the transfer bus because the flip-flop inhibits the BFPU signal. Only the low order program counter bits, which store the memory address of a word location within a sector are applied to the transfer bus. Accordingly, the transfer bus low order signal paths, i.e. those associated with bits 1 through 5, carry signals corresponding to the contents of the low order bits in the program counter. The high order bus transfer paths receive no signals from the program counter, but rather are constrained to a value corresponding to a binary ZERO. Hence, in response to the BTN signal, the noun register receives the low order bits from the program counter and receives a ZERO sector address and a ZERO page address, i.e. these noun register bits are reset as stated in operation box 114. Thus, the noun register receives a fixed, selected sector and page address without regard to the actual sector and page address stored in the program counter. It should be noted that this address in the upper order bits in the program counter remains undisturbed.

After preforming the operations indicated in the appropriate one of the boxes 112 and 114, the FIG. 1 timing and control unit 34 produces the PADV signal which, as indicated in FIG. 1, is applied to the program counter 20 and causes it to increment the location address stored in the counter to the next higher count.

As further indicated in the flow chart of FIG. 3A, the timing and control unit 34 produces a WR signal that, as indicated in FIG. 1, is applied to the working register 18 and, as indicated in the operation box 116, resets the working register. Thereafter, the timing and control unit produces a Memory Cycle Initiate (MCI) signal and a MREAD (Memory Read) signal to start a read cycle in which contents of the memory 12 addressed by the noun register are read into the working register 18. At the conclusion of the memory read cycle, a specified instruction word has been read from the memory and into the working register 18.

The timing and control unit 34 next transfers the high order four bits of this instruction word, i.e. the contents of working register bits 6 through 9, to the verb register 30 by simultaneously producing the Bus From Working Upper (BFWU) and Bus To Verb (BTV) control signals, all as indicated in the flow chart with operation box 120. This operation places the sector bit, i.e. bit number 6, and the operation code of the instruction into the verb register.

These digits are applied to the decoder 38 in the timing and control unit 34 and the next operation in the fetch cycle depends on the value of the sector bit, as indicated by the decision box 122 in the fetch cycle flow chart. When the sector bit is a ZERO, the instruction in the working register is to be performed using information stored in the same memory sector as was used in the preceding memory cycle and hence which is identified by the upper order bits of the program counter. Accordingly, when the answer from the decision box 122 is a "-No," the timing and control unit 34 assembles a memory address in the noun register 16 using the upper order bits from the program counter and the low order bits of the working register 18. These pieces of information are transferred onto the bus with the BFPU and BFWL control signals and are gated into the noun register with a BTN control signal, all is indicated with the operation box 124 in FIG. 3A.

On the other hand, when the sector bit is a ONE, the operating sequence advances to the operations indicated in box 126, in lieu of those indicated in box 124, to load the upper order bits of the noun register with the sector and page address of the sector register 26. For this purpose, the timing and control unit 34 simultaneously produces the BFS, BFWL and BTN signals which respectively apply to the transfer bus paths associated with bits 6 through 11 the contents of the sector register 26, apply to the transfer bus paths associated with bits 1 through 5 the low order bits of the working register, and apply to the noun register the information thus applied to the transfer bus.

At this juncture the illustrated processor has completed the fetch cycle indicated in FIG. 3A and advances to an execution cycle in which the instruction read from the memory during the fetch cycle is executed. It is significant to note that in the first half of the fetch cycle the memory address assembled in the noun register uses the contents of the program counter except when the force sector zero flip-flop is set, and in that instance a predetermined memory sector is addressed. As described above, this forced reference to memory sector ZERO is advantageously used in the latter portion of the interrupt routine when the processor is preparing to resume operation in the program that was executing prior to the interrupt.

In addition, in the latter half of the fetch cycle, the timing and control unit 34 assembles a further address in the noun register 34 drawing on the sector identified in the program counter when the sector bit of the fetch instruction is a ZERO and drawing on the sector addressed in the sector register when the instruction sector bit is a ONE.

Figure 3B:
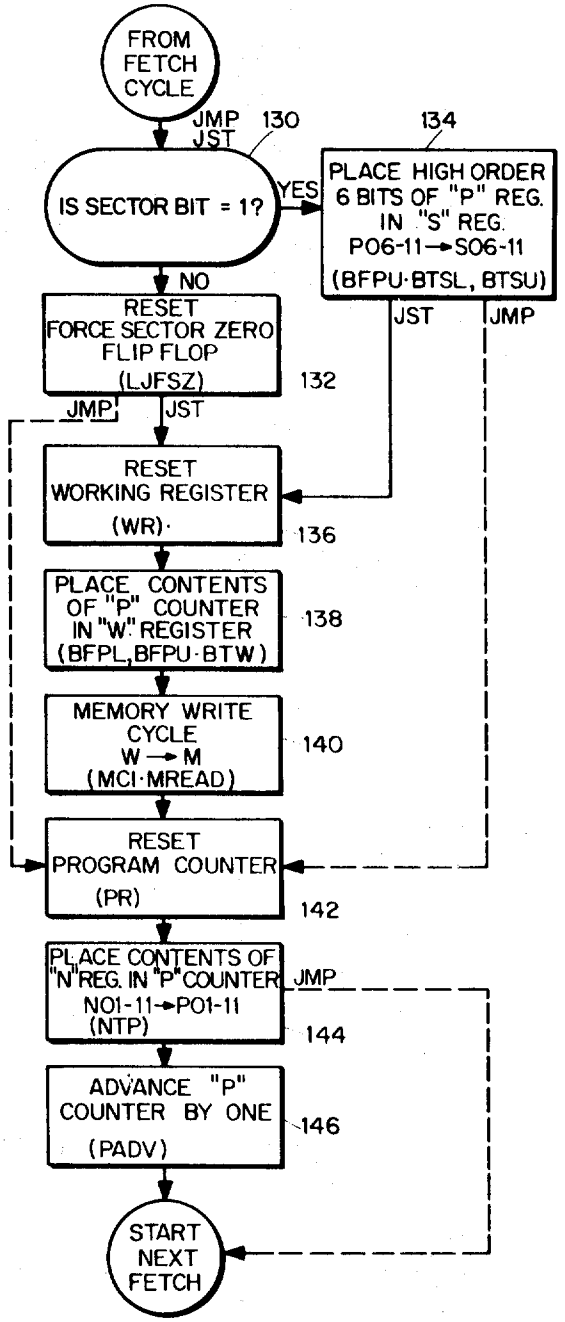

The flow chart of FIG. 3B shows the sequence of decisions and operations which the control unit 34 performs to execute branch control instructions, i.e. the jump (JMP) and the jump and store (JST) instructions. Consider first the jump instruction. Where bit 6 of the instruction word i.e. sector bit, is a ZERO, the control unit 34 advances from decision box 130 to the operation box 132 and produces a LJFSZ signal to reset the force sector zero flip-flop 39. This flip-flop is reset at this time in the event the jump instruction is being used in the recovery from an interrupt routine as described above.

On the other hand, when the sector bit in a ONE, indicating that the jump instruction is to operate with a memory sector different from the one currently addressed in the program counter, the timing and control unit 34 generates three control signals indicated in operation box 134, i.e. the signals BFPU, BTSL and BTSU. These signals respectively apply to the transfer bus the upper order digits stored in the program counter, and transfer to the sector register upper and lower stages, the signals on the corresponding paths of the transfer bus. Hence these three signals transfer to the sector register the sector and page address stored in the program counter.

The next control signal which the timing and control unit 34 produces in response to a jump instruction is the PR signal that, as indicated in the operation box 142 in FIG. 3B resets the program counter.

Thereafter, the timing and control unit 34 transfers the contents of the noun register 16 to the program counter by producing a NTP (Noun To Program) control signal. As indicated in FIG. 3B, this completes the execution phase of the jump instruction.

Further reference to FIG. 3B, when a jump-store (JST) instruction is read from the core memory 12 and the upper order bits thereof transferred to the verb register during the fetch cycle performed in accordance with FIG. 3A, the timing and control unit 34 again examines the sector bit, decision box 130, and either resets the force sector zero flip-flop, operation box 132, or loads the sector register with the sector and page address in the program counter, operation box 134, in the same manner as for the jump instruction. Next, the timing and control unit 34 produces a WR signal that resets the working register, operation box 136, and then transfers the program counter contents to the working register, operation box 138, by generating the control signals BFPL, BFPU and BTW. These signals apply to the transfer bus the contents of the upper and lower order bits of the program counter and apply to the working register the signals thus applied to the transfer bus.

As indicated with operation box 140, thereafter the timing and control unit 34 produces the Memory Cycle Initiate and Memory Read control signals that write into the core memory 12 the word just loaded into the working register 18. The remaining operations which the timing and control unit 34 performs for the jump-store instructions are to reset the program counter, operation box 132, load the program counter with the contents of the noun register, operation box 144, and then advance the program counter low order count by a one with a PADV signal, operation box 146.

Note in FIG. 3B that for both the branch control instructions JMP and JST, the present processor is arranged to reset the force sector zero flip-flop when the sector bit calls for an operation with the same memory sector as previously stored in the program counter. Alternatively, when the sector bit indicates that the next memory cycle is to use a sector different from that addressed in the program counter, the processor saves the memory sector identified in the program counter by transferring the sector and page address therein to the sector register.

With further reference to FIGS. 3A and 3B, note that when a branch control instruction is to be performed using a memory sector different from the one addressed in the program counter, i.e. when the instruction word sector bit in a ONE, the fetch and execution cycles for that branch instruction together swap the contents of the program counter and the sector register. That is, this succession of fetch cycle and a branch instruction execute cycle save the page and sector address currently in the program counter in the sector register, concurrent with the transfer of the new sector address from the sector register into the program counter. This operation is valuable because when the computer is performing a routine in one sector of memory and then branches to operate in a different sector of memory, it often returns to operation in the initial memory sector. Accordingly, by saving the address of this sector in the sector register while the branching instructions are being executed, the computer can quickly resume addressing the prior memory sector without having either to store off in the memory the address of that prior sector or even to execute any memory cycles to recover this prior memory sector address.

In particular, with reference to FIG. 3A, note that when the instruction just fetched calls for further operation in a different memory sector, decision box 122, the timing and control unit 34 executes the operations indicated in box 126, i.e. it transfers the new sector address from the sector register to the noun register. At this point, the contents of the sector register are no longer important. The timing and control unit 34 then commences the execution cycle for the branch control instructions indicated in FIG. 3B and, when operation with a different memory sector is indicated as determined with decision box 130, transfers the current sector address in the program counter to the sector register. This transfer thus "saves" the sector address of prior operation. Then the unit 34 transfers the address of the new sector into the program counter from the noun register, in accordance with decision box 144.

Figure 2:
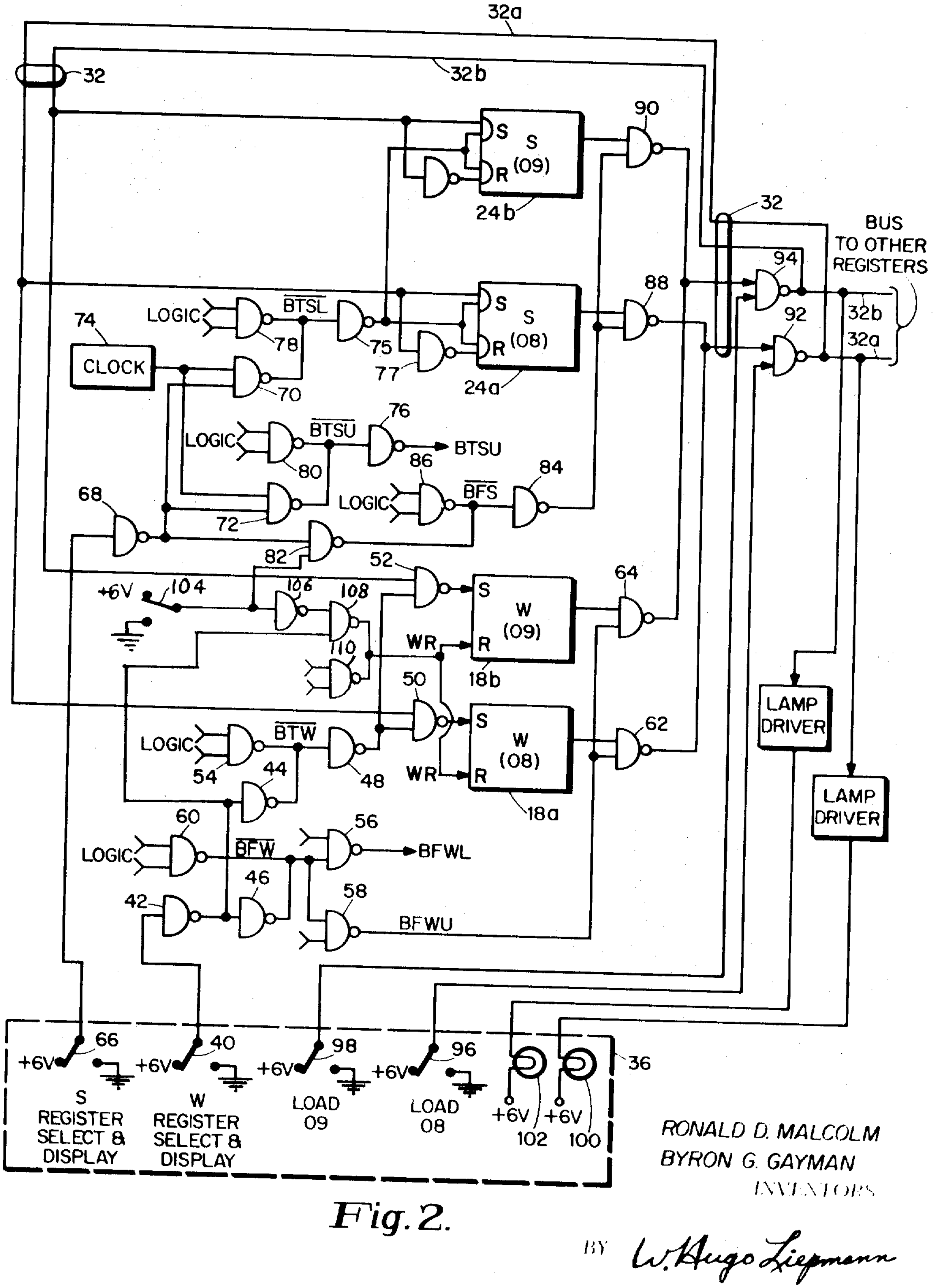
FIG. 2 is a logical block diagram showing the arrangement of the transfer bus with the registers and with the panel controls and indicators in the processor of FIG. 1.

Referring again to FIG. 1, the timing and control unit 34 includes a panel 36 having control switches and indicators. Fig. 2 shows in further detail the arrangement of the working register 18 and the sector register 26 of the processor with the transfer bus 32 and with these switches and indicators on the panel 36.

Two stages **18*a* and 18*b*, illustratively the stages that store the upper order bits numbers 8 and 9, represent the working register 18. An two sector registers stages 24*a* and 24*b*, which store the sector low order bits 8 and 9, represent that register. Each stage is constructed with a bistable circuit such as a flip-flop, but the working register stages 18*a* and 18*b* are illustrated as being responsive to a direct current, level-type input signal whereas the sector register stages 24*a* and 24*b* respond to input signal transitions, i.e. to a so called AC signal. The connections for these four stages are typical for other stages in the registers 18 and 24, and these two registers in turn are typical of the arrangement of the other FIG. 1 processor registers which are to be operated from the panel 36**.

FIG. 2 also shown two transfer bus conductors **32*a* and 32*b* that constitute the bus signal paths that carry the bits associated with bit positions 8 and 9**, respectively.

On the panel 36, a W Register Select switch 40 is arranged to apply signals on the transfer bus to the working register inputs, and to apply the register output signals to the bus. The former is done by producing the BTW control signal, and the latter is done with the two signals BFWL and BFWU that respectively energize the bus from the low order, and from the upper order, stages of the working register.

In detail, when the switch 40 is depressed from the normal position shown in FIG. 2, the ground level applied to its moving contact is inverted, illustratively to plus 6 volts, by a gate 42 and applied in parallel to gates 44 and 46. The illustrated gates are NAND gates of conventional construction. The ground level output signal from gate 44, which is the negation of the BTW signal, is inverted in gate 48 to the illustrated 6-volt assertion level that enables register input gates 50 and 52. The output leads from these gates and connected, respectively, to the set inputs of the working register flip-flop stages **18*a* and 18*b*. The other input to gate 50 is the bus conductor 32*a* and hence when this gate is enabled by the BTW signal, the working register stage 18*a* is set when this bus conductor carries a binary ONE signal. Similarly, the bus conductor 32*b* is applied to the other input of gate 52 so that, when the BTW signal enables that gate, a binary ONE signal on the conductor 32*b* sets the stage 18*b***.

In order for the FIG. 1 control unit 34 to develop the BTW signal otherwise than with the panel switch 40, logic signals are applied to a further gate 54. The output of this gate is OR'd with the output of the gate 44 to operate the gate 48 that develops the BTW signal, as appropriate for automatic, program-controlled operation of the processor.

The output of the gate 46, which is also energized when the W selection switch 40 is depressed, is applied in parallel to gates 56 and 58, the output signals from which are the desired BFWL and BFWU signals. The gates 56 and 58 operate as OR gates and hence other input conditions to them can produce either or both the BFWU and BFWL signals. Similarly, a gate 60 receives other logic input signals in the control unit 34 to operate the gates 56 and 58 during automatic, programmed controlled operation of the processor.

As also shown in FIG. 2, the BFWU signal from gate 58 enables register output gates 62 and 64 that, respectively, apply to the bus conductors **32*a* and 32*b* signals corresponding to the state of the register stages 18*a* and 18*b***.

In a similar manner, an S Register Select switch 66 on the panel 36, upon being depressed, causes the sector register 24 to receive the signals on the bus 32, and the bus to receive signals corresponding to the state of each stage in this register. This is done by inverting the ground signal, applied to the switch moving contact when it is operated, with a gate 68 having an output terminal connected to gates 70 and 72. A clock 74 in the timing and control unit 34 of FIG. 1 applies a succession of timing pulses to the other input of each of these gates. As a result, when the gates 70 and 72 are enabled by operation of the switch 66, they respectively apply inverted timing pulses to a gate 75 whose output is the BTSL signal and to a gate 76 whose output is the BTSU signal. The BTSL signal is applied to the clock input of each sector register stage **24*a* and 24*b***. The BTSU signal is applied to the clock inputs of the other, upper order, sector register stages, which are not shown.

The sector register stage 24a also has a pair of steering inputs, one of which receives the signal on the bus conductor 32a and the other of which receives the inverse of this signal from a gate 77. Accordingly, when the S Register switch 66 on the panel 36 is depressed, so that the stage 24a receives pulses at its clock input, the stage is repetitively switched to the state corresponding to the signal on the bus conductor 32a. In a like manner, the stage 24b has steering inputs that receive the signal on the bus conductor 32b and the complement thereof so that this stage also is switched to the state determined by the signal on bus conductor 32b when the S Register Select switch 66 is depressed.

With further reference to FIG. 2, a gate 78 operates the gate 75 to produce the BTSL signal in response to other logic conditions as required and, correspondingly, a gate 80 operates the gate 76 to produce the BTSU signal in response to other logic conditions.

The contents of the sector register stages 24a and 24b are applied to the bus conductors 32a and 32b, when the panel switch 66 is depressed, in response to a BFS signal produced by applying the output of gate 68 successively to gates 82 and 84 as shown; a further gate 86 also can operate the gate 84 in response to program controlled conditions. The BFS signal output from the gate 84 enables, when the sector switch 66 is depressed, an output gate 88 connected with the stage 24a and an output gate 90 connected with the stage 24b. The output terminals of these gates are connected respectively to the bus conductors 32a and 32b.

As also shown in FIG. 2, the bus 32 signal path associated with bit position 8 includes a gate 92 connected to receive as one input signal the OR'd output signals from the output gates 62 and 68 connected with stages 18a and 24a that store the bit numbered 8. The other input to the gate 92 is the ground level signal a "Load 8" switch 96 on the panel 36 produces when depressed from the normal position shown. The output terminal on the gate 92 is connected to the continuation of the bus conductor 32a, however the outgoing conductor 32a has a signal that is the complement of the signal the gate 92 receives from the incoming segment of conductor 32a. With this arrangement, when the load switch 96 is in the normal position shown, the illustrative plus 6-volt assertion signal applied to the switch moving contact enables the gate 92 to develop an output signal that corresponds to the complement of the input signal it receives. However, when the Load 8 switch 96 is depressed, the gate 92 is disabled and its output is forced to the illustrative plus 6-volt assertion level. This signal is fed back by way of the bus 32 to the input gate 50 of the working register stage 18a and to the steering inputs of the sector register stage 24a. As a result, whichever register is selected with the switch 40 or 66 on the panel 36 will have its number 8 stage 18a or 24a placed in the ONE state when the Load 8 switch is depressed.

In a similar manner, a "Load 9" switch 98 on the panel 36, upon being depressed, disables the gate 94 to force the segment of bus conductor 32b connected to the output terminal thereof to the assertion level, which is then fed back by way of the bus to the inputs of the register stages storing the number 9 bit.

As is also shown in FIG. 2, the panel 36 includes an indicator lamp 100 associated with bus conductor 32a and a lamp 102 associated with bus conductor 32b. A lamp driver is connected to receive the signal on the associated bus conductor and operate the lamp when the bus conductor carries the signal corresponding to a binary ONE.

The control unit, bus, and panel control circuits of FIG. 2 operates in the following manner. Normally the automatic operation of the processor is stopped before the panel switches are operated. If only a Load switch such as a switch 96 is depressed from the normal position shown, the register stages remain unchanged and the segment of the bus conductor 32a output from gate 92 is constrained to the illustrated plus 6 assertion level corresponding to a binary ONE. Hence the lamp 100 would light.

However, when the S Register Select switch 66 is depressed and then switch 96 is depressed, the assertion signal which the Load switch applied to conductor 32a is applied to the steering inputs of the stage 24a in such a manner that the BTSL signal produced in response to the depression of switch 66 switches the stage 24a to the ONE condition. The BFS signal also produced in response to actuating the S Select switch 66 applies the output signal from the stage 24a back to the bus conductor 32a. Hence when the Load switch is released but the switch 66 remains depressed, the bus conductor 32a circulates the ONE condition signal from the stage 24a output back to its input so that the stage remains in the ONE state.

At the same time, since the Load 9 switch 98 is not depressed but the S switch 66 is depressed, the sector register 24b applies to the bus conductor 32b a signal corresponding to the present state of this stage. This signal is recirculated on the bus conductor 32b to the stage steering inputs, so that as long as the switch 66 remains depressed the stage is repetitively switched to that state. At the same time, the display indicator 102 displays this state of the stage 24b.

Similar operation is obtained with the working register stages when the W Select switch 40 is depressed rather than the S switch 66.

The panel 36 also has a reset switch 104 depressed from the position shown to clear whichever register is being selected with switches 40 and 66. The illustrated working register stages are constructed for reset-input signals to override set input signals.

Thus, the control and bus arrangement shown in FIG. 2 provides for the display of any one selected register, including the counter 20, in the processor and provides for the manual control of that register from the control panel with a minimum of hardware and with a minimum of cost. In particular, the panel switches and indicators connect directly to the transfer bus; there are no intervening buffer, hold or other storage devices. Also, the panel Select switches are arranged to generate the same "Bus To" and "Bus From" control signals that are already provided for in the processor control unit 34 (FIG. 1) for normal program controlled operation.

Further, the recirculating arrangement of the transfer bus with the logic gating circuits maintains whichever register is selected with the panel Select switch in its original state until new contents are keyed in with the Load switches. Thereafter, the new information is maintained in the register until manually or automatically changed. Further, the contents of each register stage are automatically displayed. The invention achieves this result by a recirculating arrangement of the transfer bus and by having the Select switch turn on both the input and the output gates associated with the register being selected. As a result, the selected register is continually outputting its contents to the bus and being loaded from the bus with the same contents.

It should be noted, with reference to FIG. 2, that when the gate 62, for example, receives no assertion-level signals, the gate changes its output terminal to the negation signal, i.e. to the signal level corresponding to a binary ZERO.

These same circuits are used for the program counter 20 stages and to gate these stages with the transfer bus. Accordingly, when the force sector zero flip-flop 39 (FIG. 1) is set, as described above, this clamping operation of these register output gates maintains ZERO-value signals on the bus transfer paths associated with bit positions 6–11 to reset the associated noun register stages as called for by operation box 114 in the FIG. 3A flow chart.

In summary, described above is a digital data processor in which the processor registers are interconnected by a common transfer bus in a manner that makes possible a wide variety of information exchanges within the processor in response to a relatively small number of control instructions. Further, the processor requires only a relatively small number of gates and relatively little timing and control hardware. Each of these features makes possible cost savings in manufacturing the processor.

Further, the processor arrangement makes possible efficient transfer of memory sector address information between the program counter and the sector register. These transfers are used in entering new information into the program counter and facilitate resuming operations, in a memory sector from which the computer branched, with high degree of efficiency, i.e. with few gating circuits and with few instructions.

Also, the timing and control unit of the processor has a force sector zero flip-flop that directs memory cycles to a fixed preselected memory sector without regard to, and without disturbing, the memory sector address stored in the program counter. As described above, this instruction and the resulting operation make the resumption of normal operation following an interrupt possible with minimal hardware and with few instructions. It should be noted that alternative to the illustrated arrangement in which the force sector zero flip-flop blocks the transfer of a sector address to the bus, the same result can be attained by blocking the application to the noun register of a sector address other than the desired "forced" value.

It should be noted that the reduction in the number of instructions which the present invention makes possible enables the processor to operate with a small memory, because the more instructions a processor requires the more memory space it must use up simply to store its instruction repertoire.

As also described above, the present processor is so arranged that the panel controls and indicators operate directly with any one selected register by way of the recirculating transfer bus, without requiring intermediate storage between the panel controls and indicators and the registers or bus.

It will thus be seen that the object set forth above, among those made apparent from the preceding description and including the provision of a processor particularly suited for low cost manufacture and hence wide spread use in applications where previously it was uneconomical to utilize automatic data processing with a stored program, are efficiently attained. Since certain changes may be made in the above construction without departing from the scope of the invention, it is intended that all matter contained in the above description or shown in the accompanying drawings shall be interpreted as illustrative and not interpreted in a limiting sense.

It is also to be understood that the following claims are intended to cover all the generic and specific features of the invention herein described, and all statements of the scope of the invention which, as a matter of language, might be said to fall between.

Having described the invention, what is claimed as new and secured by Letters Patent is:

1. A digital data processor for operation with an addressable memory and having plural registers including an accumulator register, an adder, a working register for transferring information with said memory, a noun register for applying an address signal to said memory, a program counter, and a verb register for receiving instruction operation codes from said working register, each of said registers having plural stages so ordered that each stage in a register is associated with a different digit position, said processor further comprising a transfer bus interconnecting said registers and wherein;

A. said transfer bus includes plural signal paths so ordered that each path is associated with one said digit position, and B. said working register includes:

1. first gate means for transferring information stored in a first group of stages therein associated with a first set of digit positions to the associated paths of said bus in response to a first working register output control signal, 2. second gate means for transferring information stored in a second group of stages therein associated with a second set of digit positions to the associated paths of said bus in response to a second working register output control signal, and 3. third gate means for transferring information stored in a third group of stages therein, said third group of stages selected from a subgroup of said first group of stages, to paths of said bus associated with said second set of digit positions in response to a third working register output control signal, and wherein said processor further comprises C. a sector register including fourth gate means for receiving information from bus paths associated with said second set of digit positions in response to a first sector register input control signal, and D. timing and control means operable to simultaneously produce said second working register and said first sector register control signals so as to transfer information from said second group of stages of said working register to said sector register, and further alternatively operable to simultaneously produce said third working register and said first sector register control signals so as to transfer information in said third group of stages of said working register to said sector register.

2. A processor as defined in claim 1 wherein:

A. said transfer bus includes signal paths associated with a third set of digit positions in addition to paths associated with said first and second sets of digit positions, B. said working register includes:

1. means for transferring information stored in a subgroup of stages from said first set of digit positions to said transfer paths associated with said third set of digit positions in response to a fourth working register output control signal, C. said sector register includes:

1. means for receiving information from said bus paths associated with said third set of digit positions for storage in stages therein associated with said third set of digit positions in response to a second sector register input control signal, and 2. means for transferring information stored therein in stages associated with said second and third sets of digit positions to associated paths of said bus in response to sector register output control signals, and wherein:

D. said program counter is connected to receive information from said bus paths associated with said first, second and third sets of digit positions for storage in stages associated with said first, second and third digit positions in response to program counter input control signals.

3. A processor as defined in claim 2 wherein:

A. said program counter includes:

1. means for transferring to said bus information stored in stages therein associated with said first set of digit positions in response to a first program counter output control signal, 2. means for transferring to said bus information stored in stages therein associated with said second and third sets of digit positions in response to a second program counter output control signal, and wherein:

B. said timing and control means includes logic means for producing each of said first and second program counter output signals independent of each other and further includes a bistable device connected with said logic means for selectively inhibiting production of said second program counter output control signal.

4. In a digital data processor having a plurality of multistage registers, wherein each of said stages comprises a bistable storage device having an input and an output for respectively receiving and sending signals, the combination comprising:

A. first and second switch means:

B. first gate means coupled for control by said first switch means and connected to transfer said signals to said bistable storage device input when enabled by said first switch means;

C. second gate means coupled for control by said second switch means and connected in a first path to transfer a signal stored in said device to said first gate means when said second gate means is enabled by said second switch means;

D. third gate means having an input and an output coupled in the connection of said first path between said second and first gate means, so that said second gate means and said third gate means input forms a first junction and so that the coupling of said third gate means output and said first gate means forms a second junction;

E. third switch means coupled in a first mode to enable said third gate means for transfer of said signal to said first gate means and coupled in a second mode to transfer a preselected signal to said first gate means for storage in said device.

5. The combination as defined in claim 4 further comprising a transfer bus coupled at one end to said second junction and at the other end to a corresponding second junction of a corresponding device in another of said plurality of registers.

6. The combination as defined in claim 5 further comprising an indicator means coupled to said first path for indicating a signal representing said preselected signal when said first and second switch means are coupled to enable said first and second gate means, respectively.

7. The combination as defined in claim 6 wherein said indicator means is coupled to said second junction and wherein said indicator means indicates a signal similar to said preselected signal when said third switch means is in either of said first and second modes.

8. The combination as defined in claim 4 wherein said third switch means includes:

A. means for enabling said signal stored in said device to be received by said first gate means;

B. means for disabling said signal stored in said device from being received by said first gate means; and C. means for transferring said preselected signal to said first gate means for storage in said device when said means for disabling disables said signal stored in said device from being received by said first gate means.

9. In a digital data processor for operation with an addressable memory and having plural registers including an accumulator register, an adder, a working register for transferring information with said memory, a noun register for applying an address signal to said memory, a program counter, a verb register for receiving instruction operation codes from said working register, and a sector register arranged for transfer of information with said other plural registers, each of said registers having plural stages so ordered that each stage in a register is associated with a different digit position, said processor further having a transfer bus interconnecting said registers and wherein said address signal includes first instructions having word, sector and page addresses, each page including a plurality of sectors and each sector including a plurality of words, the method steps comprising:

A. entering a fetch cycle;

B. deciding whether to address said memory with the sector address stored in said sector register or with the sector address identified by an immediately preceding instruction;

C. resetting the sector and page locations in said noun register to address a predetermined location in said memory and transferring the word address in said program counter into the word location of said noun register if said step of deciding determines that the sector address of said sector register is to be used to address said memory;

D. placing the word, sector and page addresses in said program counter into said noun register if said step of deciding determines that the sector address of said immediately preceding instruction is to be used to address said memory;

E. advancing said program counter by one memory position;

F. resetting said working register;

G. reading information including a second instruction having an operation code and a word address stored in the position in said memory currently addressed by said noun register into said working register;

H. transferring the operation code in said working register into said verb register;

I. determining from said operation code whether to address said memory with the sector address stored in said sector register or with the sector address identified by an immediately preceding instruction;

J. transferring the sector and the page addresses contained in said sector register into the sector and page locations of said noun register and transferring the word address contained in said working register into the word location of said noun register if said step of determining indicates that the sector address of said sector register is to be used to address said memory;

K. transferring the sector and page addresses contained in said program counter to the sector and page location in said noun register and transferring the word address contained in said working register to the word location of said noun register if said step of determining indicates that the sector address of an immediately preceding instruction is to be used to address said memory; and L. exiting said fetch cycle.

10. In a digital data processor as defined in claim 9, the additional method steps comprising:

A. entering an execution cycle;

B. determining whether to address said memory with the sector address stored in said sector register or with the sector address identified by an immediately preceding instruction;

C. transferring the sector and page addresses contained in said program counter into the sector and page locations of said sector register if said step of determining indicates that the sector address of said sector register is to be used to address said memory;

D. resetting mode indicator means to indicate that the sector address identified by an immediately preceding instruction is to be addressed in said memory if said step of determining indicates that the sector address of an immediately preceding instruction is to be used to address said memory;

E. resetting said working register;

F. transferring the word and sector addresses contained in said program counter into the word and sector locations of said working register;

G. writing the word and sector addresses contained in said working register into the position in said memory currently addressed by said noun register;

H. resetting said program counter;

I. transferring the word, sector and page addresses contained in said noun register into the word, sector and page locations of said program counter;

J. advancing said program counter by one memory position; and

K. exiting said execution cycle.

11. In a digital data processor as defined in claim 9, the additional method steps comprising:

A. entering an execution cycle;

B. determining whether to address said memory with the sector address stored in said sector register or with the sector address identified by an immediately preceding instruction;

C. transferring the sector and page addresses contained in said program counter into the sector and page locations of said sector register if said step of determining indicates that the sector address of said sector register is to be used to address said memory;

D. resetting said program counter;

E. transferring the word, sector and page addresses contained in said noun register into the word, sector and page locations of said program counter;

F. exiting said execution cycle.

12. A digital data processor for operation with an addressable memory and having a plurality of registers including a working register having *m* storage locations for transferring information with said memory, a noun register having *n* storage locations for applying an address word to said memory, a program counter having *n* storage locations, a verb register for receiving instruction words from said working register, and a sector register having *k* storage locations, said memory including a plurality of storage locations, each location in said memory including *m* bits of information, wherein *k* is less than *m*, and *m* is less than *n*, each stage of said above enumerated registers having a plural stages so ordered that each stage in a register is associated with a different digit position, said processor further comprising a transfer bus interconnecting said above enumerated registers, wherein said transfer bus includes plural signal paths so ordered that each path is associated with one said digit position, and further comprising;

A. a plurality of memory address words each having *n* bits including bits designating a page address, a sector address within a page, and a word address within a sector;
B. an instruction word having m bits including bits designated a word, an operation code and an FSZ bit, said FSZ bit designating the register source of a sector and page address;
C. means for loading said program counter with one of said plurality of memory address words;
D. means for loading said sector register with the page and sector bits of one of said plurality of memory address words;
E. means for loading one of said plurality of memory address words into said noun register, including:
   1. means for loading said word address bits from said program counter into said noun register,
   2. means for loading said page and sector address bits from said counter into said noun register when said FSZ bit of said instruction word is in a first state, and
   3. means for loading said page and sector address bits from said sector register into said noun register when said FSZ bit of said instruction word is in a second state.

13. A processor as defined in claim 12 further comprising:

A. means for loading selected sector address bits, independent of the sector address bits in said program counter and in said sector register, into said noun register; and
B. means for maintaining the bits loaded in said program counter and in said sector register undisturbed during said loading of said selected sector address bits.

14. A processor as defined in claim 12 further comprising:

A. means for responding to a branch instruction of said operation code, said means for responding comprising:
   1. first means for transferring the sector address bits from said sector register to said noun register,
   2. second means for transferring the sector address bits from said program counter to said sector register, and
   3. third means for transferring to said program counter said sector address bits loaded in said noun register from said sector register by said first means for transferring;
B. means for detecting the termination of said branch instruction; and
C. means for restoring to said program counter said sector address bits loaded in said sector register from said program counter by said second means for transferring when said means detecting detects the termination of said branch instruction.

15. A processor as defined in claim 12 further comprising:

A. control and transfer means comprising:
   1. gate means for producing control signals for storing sector address bits in said noun register from any one of said program counter and said sector register and word address bits in said noun register from said program counter and
   2. a control element connected with said gate means for selectively inhibiting the storage of sector address bits from said program counter and from said sector register independent of said storage of word address bits in said noun register, for said loading of said selected sector address bits.

16. A processor as defined in claim 12, further comprising:

A. first gate means and second gate means for transferring respectively sector address bits and word address bits from said program counter to said noun register and
B. control and transfer means comprising:
   1. for producing first and second control signals for enabling said first and second gate means,
   2. a bistable control element connected to inhibit said first control signal when said second control signal is produced, and
   3. further gate means for storing selected sector address bits in said noun register in the absence of sector address bits from any one of said program counter and said sector register.

UNITED STATES PATENT OFFICE
CERTIFICATE OF CORRECTION

Patent No. 3,602,889 Dated August 31, 1971

Inventor(s) Byron G. Gayman, et al

It is certified that error appears in the above-identified patent and that said Letters Patent are hereby corrected as shown below:

Column 14, line 68, the colon should be a semi-colon -- ; --. Column 17, line 8, cancel "a" (first occurrence). Column 18, line 22, after "register", line 24, after "counter", line 28, after "register", line 34, after "register", each occurrence, insert a comma -- , -- ; line 36, after "1." insert -- means -- .

Signed and sealed this 10th day of October 1972.

(SEAL)
Attest:

EDWARD M.FLETCHER,JR.
Attesting Officer

ROBERT GOTTSCHALK
Commissioner of Patents